United States Patent
Perez et al.

(10) Patent No.: US 11,169,733 B2
(45) Date of Patent: Nov. 9, 2021

(54) ASSET PROCESSING FROM PERSISTENT MEMORY

(71) Applicant: HEWLETT-PACKARD DEVELOPMENT COMPANY, L.P., Spring, TX (US)

(72) Inventors: Taciano Perez, Porto Alegre (BR); Pedro Garcez Monteiro, Porto Alegre (BR); Roberto Bender, Porto Alegre (BR); Diego Rahn Medaglia, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,188

(22) PCT Filed: Oct. 26, 2017

(86) PCT No.: PCT/US2017/058582
§ 371 (c)(1),
(2) Date: Oct. 14, 2019

(87) PCT Pub. No.: WO2019/083538
PCT Pub. Date: May 2, 2019

(65) Prior Publication Data
US 2021/0149589 A1    May 20, 2021

(51) Int. Cl.
*G06F 13/00*   (2006.01)
*G06F 3/06*    (2006.01)
*A63F 13/95*   (2014.01)
*G06F 9/46*    (2006.01)

(52) U.S. Cl.
CPC ............ *G06F 3/0656* (2013.01); *A63F 13/95* (2014.09); *G06F 3/0611* (2013.01); *G06F 3/0659* (2013.01); *G06F 3/0673* (2013.01); *G06F 9/466* (2013.01)

(58) Field of Classification Search
CPC .... G06F 3/0656; G06F 3/0673; G06F 3/0611; G06F 3/0659; G06F 9/46; A63F 13/95
See application file for complete search history.

(56) References Cited

U.S. PATENT DOCUMENTS

| | | | |
|---|---|---|---|
| 9,104,560 B2 * | 8/2015 | Carpentier | G06F 3/0683 |
| 10,661,169 B1 * | 5/2020 | Saucedo | A63F 13/497 |
| 2009/0203430 A1 * | 8/2009 | Peek | G07F 17/3223 463/25 |

(Continued)

OTHER PUBLICATIONS

Loading Large Assets in Modern HTML5 Games, http://smus.com/game-asset-loader/.

(Continued)

*Primary Examiner* — Jing-Yih Shyu
(74) *Attorney, Agent, or Firm* — HP Inc. Patent Department

(57) ABSTRACT

In some examples, during execution of an application as an application asset is called, an asset map that is stored in a persistent memory device is searched for an asset identifier associated with the application asset. Using this asset identifier, an application asset stored in the persistent memory device is located. The persistent memory device is directly accessed by a processor executing the application. The processor processes the application asset from its location in the persistent memory device.

20 Claims, 7 Drawing Sheets

(56) References Cited

U.S. PATENT DOCUMENTS

| | | | |
|---|---|---|---|
| 2010/0234101 A1* | 9/2010 | Morrow | G06F 21/57 463/29 |
| 2014/0043333 A1 | 2/2014 | Narayanan et al. | |
| 2014/0206452 A1 | 7/2014 | Bambino et al. | |
| 2015/0006834 A1* | 1/2015 | Dulloor | G06F 3/0604 711/162 |
| 2016/0023109 A1 | 1/2016 | Colenbrander | |
| 2017/0050110 A1 | 2/2017 | Perry | |
| 2017/0087464 A1 | 3/2017 | Perry et al. | |
| 2018/0225025 A1* | 8/2018 | Rahnama | G06F 3/04842 |
| 2019/0310796 A1* | 10/2019 | Perez | G06F 11/1469 |

OTHER PUBLICATIONS

Saving Items to the Local File System, http://support.intuilab.com/kb/interface-assets/saving-items-to-the-local-file-system.

* cited by examiner

ASSET PROCESSING FROM PERSISTENT MEMORY

BACKGROUND

Computing applications are continually growing in size, and are becoming more comprehensive in what they can do, and what they can provide for a user. Video games are one example of a computing application that has grown tremendously in recent years. The video game industry is a large industry with video games becoming more immersive and increasing in quality. For example, some advanced video games provide high-quality realist artistic assets such as high-definition images, video, and sound.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
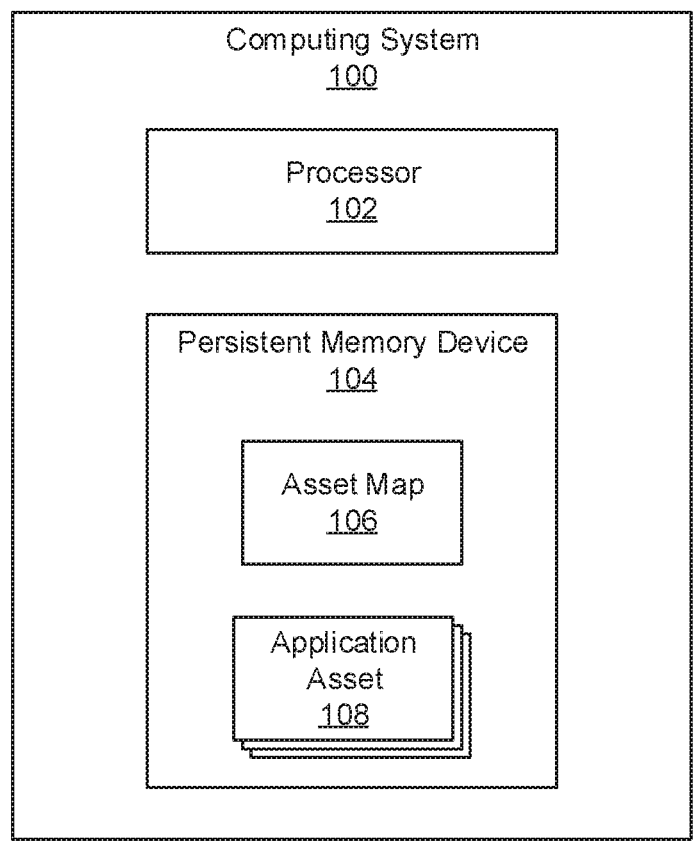
FIG. 1 is a block diagram of a computing system for asset processing from persistent memory, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing applications are continually growing in size, and are becoming more comprehensive in what they can do, and what they can provide for a user. Video games are one example of a computing application that has grown tremendously in recent years. The video game industry is a large industry with video games becoming more immersive and increasing in quality. For example, some advanced video games provide high-quality realist artistic assets such as high-definition images, video, and sound.

While such applications, and in particular video games, have come a long way, additional technical advances may provide for their more complete use. For example, customers in this segment desire a highly immersive gaming experience. Accordingly, video games of today rely on assets that create highly realistic environments via high-definition image, video, and sound. These realistic environments are data heavy and can result in long game loading and saving times, which break the user immersion, thus creating frustration and dissatisfaction.

Accordingly, the present specification provides a method and system for decreasing game loading and saving times, thus enhancing user experience and increasing customer satisfaction. Specifically, application assets, such as images, textures, character assets used in video games, and other assets are stored in a persistent memory device that is directly accessed by the processor executing the application. Accordingly, in some examples rather than copying or moving the assets from a long term storage device such as a hard drive or a spinning disk to a cache, the processor can directly access the assets in the persistent memory. Moreover, as the persistent memory is non-volatile, the information can be stored there even when power is not supplied to the corresponding system, again avoiding the copying of information to a volatile memory structure such as dynamic random-access memory (DRAM). Persistent memory devices that avoid copying or moving assets, thus provide quicker access speeds to reduce the processing lag of loading and saving application assets.

Specifically, the present specification describe a method. According to the method, during execution of an application such as a video game and as an application asset is called, an asset map is searched for an asset identifier associated with the application asset. The asset map is stored on a persistent memory device. Using this asset identifier, the application asset, which is also stored on the persistent memory device, is located. As the persistent memory device is directly accessed by the processor executing the application, the application asset can be processed from its location on the persistent memory device.

The present specification also describes a system that includes a processor to directly access application assets stored in a persistent memory device. The persistent memory device is non-volatile and directly accessed by the processor. An asset map is disposed on the persistent memory device and includes mappings between application asset locations on the persistent memory device and asset identifiers for the application assets. The persistent memory device also includes at least one application asset disposed on the persistent memory device to be directly accessed by the processor from its location on the persistent memory device.

The present specification also describes a non-transitory machine-readable storage medium encoded with instructions executable by a processor. The machine-readable storage medium includes instructions to, during a setup phase for a video game 1) identify a number of video game assets to be called during execution of the video game; 2) assign a unique asset identifier to each of the number of video game assets, 3) copy each of the number of video game assets from a storage device to a persistent memory device, which persistent memory device is directly accessed by a processor to execute the video game, and 4) insert an entry into an asset map stored in the persistent memory device, the asset map associating each video game asset with its unique asset identifier. The machine-readable storage medium also includes instructions to, during a loading phase for the video game, 1) search the asset map for an asset identifier associated with the video game asset, 2) using the asset identifier, locate the video game asset in the persistent memory device, and 3) process the video game asset, by the processor, from its location in the persistent memory device. The machine-readable storage medium also includes instructions to, during a save phase for the video game, 1) initialize a transaction in the persistent memory device, 2) update multiple video game assets as stored in the persistent memory device, which at least one of the multiple video game assets comprises user-specific information, and 3) commit the transaction.

In summary, using such an asset processing system 1) enhances technical performance by decreasing game loading and saving times; 2) enhances user experience; 3) reduces "breaks" in user immersion; and 4) facilitates higher power, and increased amounts of data transfer. However; it is contemplated that the devices disclosed herein may address other matters and deficiencies in a number of technical areas.

As used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a computing system (100) for application asset (108) processing from persistent memory, according to an example of the principles described herein. The computing system (100) may be any type of computing device that includes a processor (102). Examples of computing systems (100) include desktop computers, laptop computers, consoles such as gaming consoles; and mobile devices. In some examples, the computing systems (100) may be specifically for executing video games. For example, the computing system (100) may be a specifically designed desktop or laptop computer; a gaming console, or an enhanced reality computing system (100).

The computing system (100) includes a processor (102). The processor (102) refers to at least one processor and other resources used to process programmed instructions. For example, the processor (102) may be a number of central processing units (CPUs), microprocessors, and/or other hardware devices suitable for retrieval and execution of instructions. In one example, the processor (102) may include a number of electronic circuits comprising a number of electronic components for performing the functionality of a number of instruction sets.

The computing system also includes a persistent memory device (104). The persistent memory device (104) is a non-volatile memory device that is directly accessed by the processor (102), That is, rather than relying on a volatile memory device such as cache, or other intermediate volatile memory system to retrieve data from a long-term non-volatile storage device, the persistent memory device (104) is non-volatile and is directly accessible by the processor (102) such as a CPU. Using a persistent memory device (104), asset accesses can be quicker as there is no copying or moving the data from a non-volatile storage device to a volatile memory device. The persistent memory device (104) may be any type of persistent memory device (104) including phase-change random-access memory (PCRAM), magnetoresistive random-access memory (MRAM), spin-transfer torque random-access memory (SSTRAM), resistive random-access memory (RRAM), and memristor memory, among others. In one example, the persistent memory device (104) is directly accessed by the processor (102) at the byte-word granularity. In such examples, the computing system (100) that includes persistent memory devices (104) may not have volatile CPU caches.

As described above, the persistent memory device (104) is directly accessed by the processor (102), thus increasing efficiency by avoiding a block I/O layer, bypassing page cache, and removing additional operations associated with retrieving information indirectly from a storage device.

The persistent memory device (104) includes an asset map (106). The asset map (106) is stored on the persistent memory device (104) and includes a mapping between asset identifiers and the application assets (108) stored on the persistent memory device (104). As an application asset (108) is called during execution of an application, the asset location is identified from the asset map (106) and the application asset (108) processed directly from the persistent memory device (104). This can be done without moving or copying the application asset (108) to another memory location such as a cache. Doing so is more efficient as costly and complex retrievals from spinning media such as DVD disks, Blu-Ray® disks, hard disk drives, solid state drives, or flash drives among others are avoided. An example of an asset map (106) is described below in connection with FIG. 5.

The persistent memory device (104) also includes a number of application assets (108) that are processed during execution of an application. As with other resources on the persistent memory device (104), the application assets (108) are directly accessed by the processor (102) such as a CPU, and not moved or copied when processed by the CPU alone.

The application assets (108) refer to any asset that is relied on by an application during execution. For example, video game assets (108) for a video game application include, but are not limited to, textures, animations, videos, sounds, character data, user data, maps, and sounds, among others. While specific reference is made to particular application assets (108) related to a video game application, any number and type of application asset (108) may be stored on a persistent memory device (104) associated with any type of application.

Accordingly, the system (100) operation as described herein is enhanced by storing application assets (108) on a non-volatile persistent memory device (104) as opposed to a volatile memory device. Moreover, during execution of the application, i.e., during gameplay, rather than indirectly retrieving the application assets (108) from a long term storage device and storing them on an intermediate location, the current system (100) enhances performance by retrieving them directly from a non-volatile persistent memory device (104).

That is, some computing systems store saved games and digital art assets such as images, videos, and sounds in storage media such as magnetic/flash drives and optical discs. Accordingly, whenever a game is started/resumed, all assets are loaded from the storage medium to volatile memory where they can be directly accessed by a processor. The present system (100) however, employs a data structure in a persistent memory device (104) that contains game, or other application assets (FIG. 1, 108) where they are directly accessed by the processor (102), and in some cases a graphics processor. These application assets (108) can be loaded from a storage media to the persistent memory device (104) in a setup phase, i.e., game installation, From this point on, the application assets (108) are directly accessed by the processor (102) in the persistent memory device (104). In some examples doing so without copying and/or moving the data.

Figure 2:
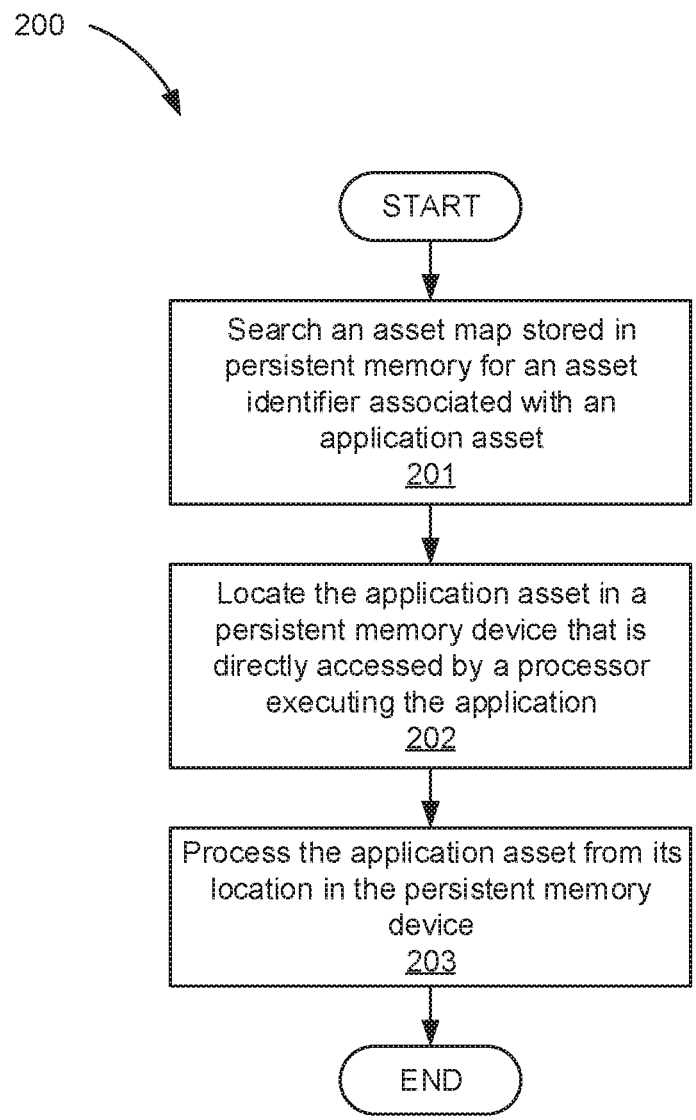
FIG. 2 is a flowchart of a method for asset processing from persistent memory, according to an example of the principles described herein.
Figure 6:
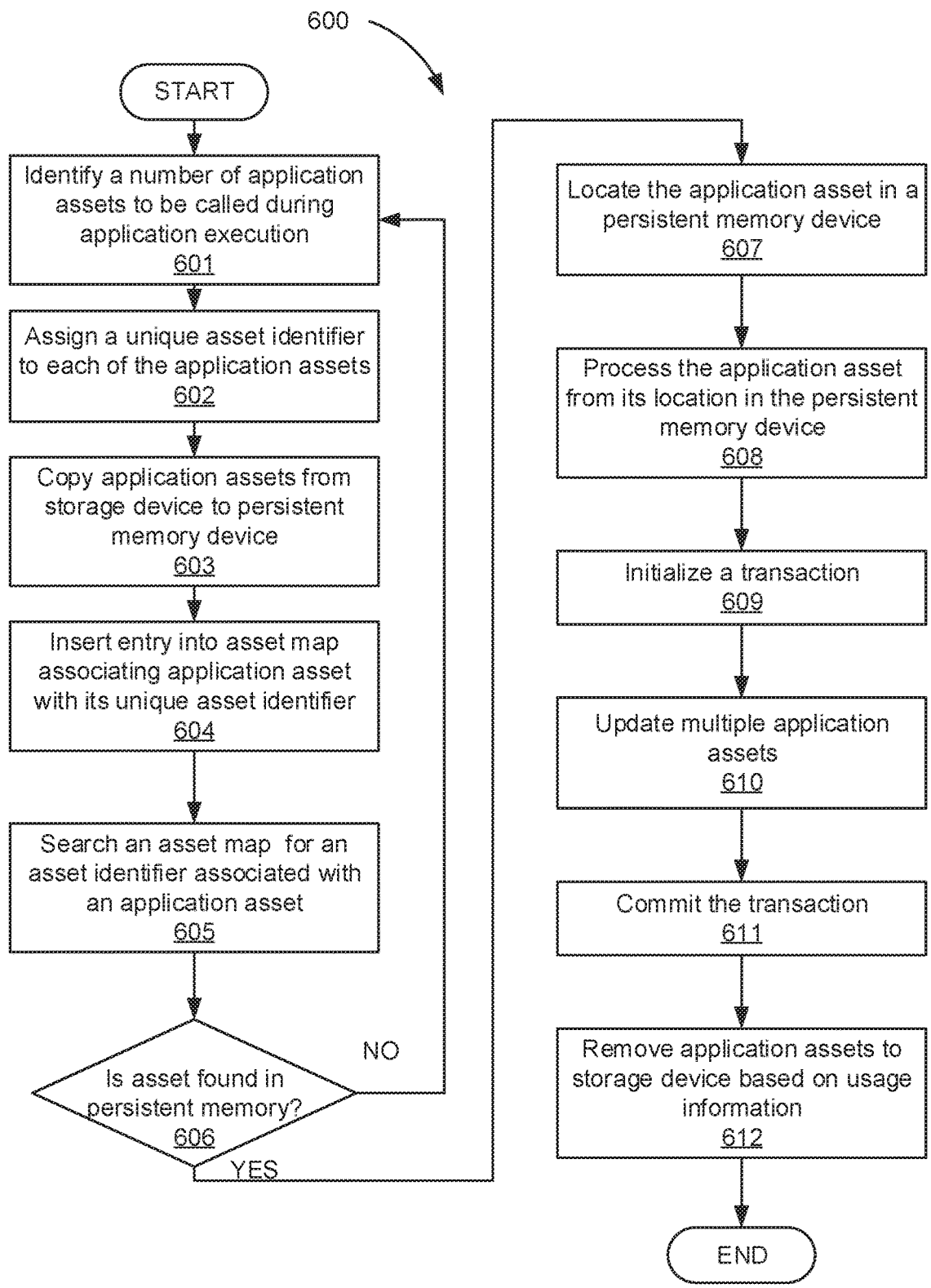
FIG. 6 is a flowchart of a method for asset processing from persistent memory, according to an example of the principles described herein.

FIG. 2 is a flowchart of a method (200) for application asset (FIG. 1, 108) processing from persistent memory, according to an example of the principles described herein. As a general note, the methods (200, 600) may be described below as being executed or performed by a particular computing device, i.e., the computing system (FIG. 1, 100). Other suitable systems and/or controllers may be used as well. The methods (200, 600) may be implemented in the form of executable instructions stored on at least one machine-readable storage medium of at least one of the devices and executed by at least one processor of at least one of the devices. Alternatively or in addition, the methods (200, 600) may be implemented in the form of electronic circuitry (e.g., hardware). While FIGS. 2 and 6 depict operations occurring in a particular order, a number of the operations of the methods (200, 600) may be executed concurrently or in a different order than shown in FIGS. 2 and 6. In some examples, the methods (200, 600) may include more or fewer operations than are shown in FIGS. 2 and 6. In some examples, a number of the operations of the methods (200, 600) may, at certain times, be ongoing and/or may repeat.

According to the method (200), an asset map (FIG. 1, 106) is searched (block 201). More specifically, as an application, such as a video game, is executed, different application assets (FIG. 1, 108) are used. For example, a video game relies on maps, animations, character assets, images, sounds, and videos to generate a gaming environment. Accordingly, at different points in time, different application assets (FIG. 1, 108) may be loaded to create the gaming environment. This asset map (FIG. 1, 106) is stored on the persistent memory device (FIG. 1, 104) such that it can be retrieved by a processor (FIG. 1, 102) such as a CPU directly from a non-volatile source without passing through a volatile memory device. In some examples, the asset identifier may be an identifier used by the game to identify the type of asset. For example, each asset identifier may have a certain header, or other identifier that indicates what type of application asset (FIG. 1, 108) it is. This may be the asset identifier for that application asset (FIG. 1, 108). In another example, the asset identifier includes a location of the application asset (FIG. 1, 108). In either example, the asset identifier could include information such as content type, size, and to which application it belongs.

Using the asset identifier found in the asset map (FIG. 1, 106), the application asset (FIG. 1, 108) is located (block 202). That is, along with the asset identifier, the asset map (FIG. 1, 106) may include a memory address within the persistent memory device (FIG. 1, 104) where the application asset (FIG. 1, 108) is stored. As noted, the persistent memory device (FIG. 1, 104) is directly accessed by the processor (FIG. 1, 102). Accordingly, the application asset (FIG. 1, 108) is then processed (block 203) from its location in the persistent memory device (FIG. 1, 104). In an example, the application asset (FIG. 1, 108) is not moved and/or copied from its non-volatile location on the persistent memory device (FIG. 1, 104).

Such a method (200) allows for easy storage of application assets (FIG. 1, 108) on a non-volatile medium, i.e., the persistent memory device (FIG. 1, 104), without having to be loaded to an intermediate volatile memory device. Avoiding the copying of data to such an intermediate volatile memory device increases memory access time, and thereby reduces application loading and saving.

Figure 3:
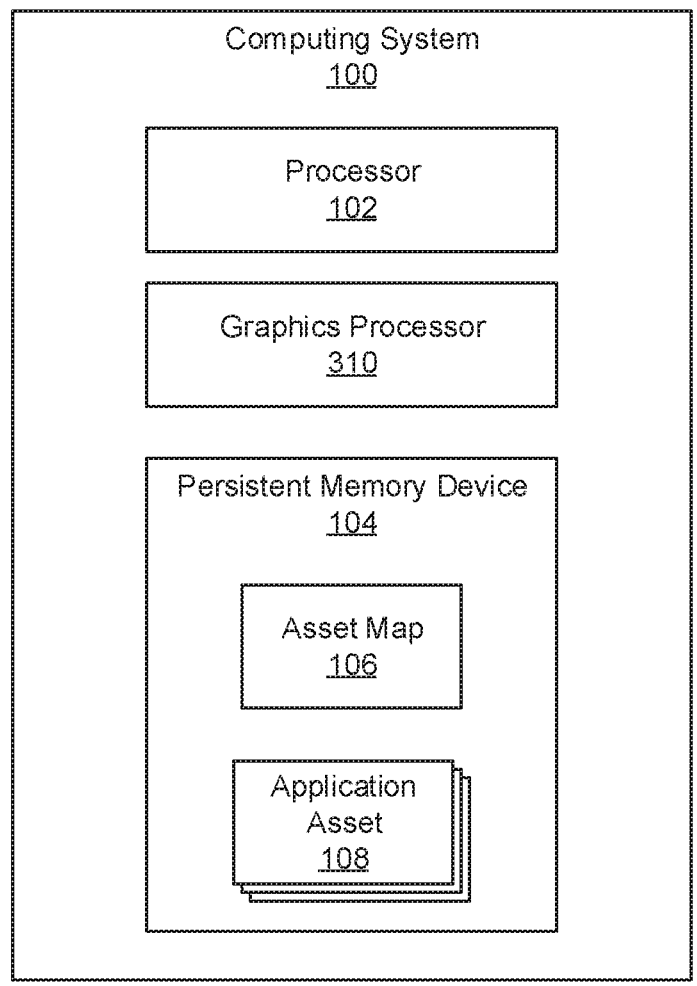
FIG. 3 is a block diagram of a computing system for asset processing from persistent memory, according to an example of the principles described herein.

FIG. 3 is a block diagram of a computing system (100) for application asset (108) processing from persistent memory, according to an example of the principles described herein. In this example, the computing system (100) includes the processor (102), persistent memory device (104), asset map (106), and application assets (108) as described above. In this particular example, the computing system (100) also includes a graphics processor (310) which increase the quality of video and graphics. When used, the graphics processor (310) lessens the work of the processor (102) and produces faster video and graphics.

Figure 4:
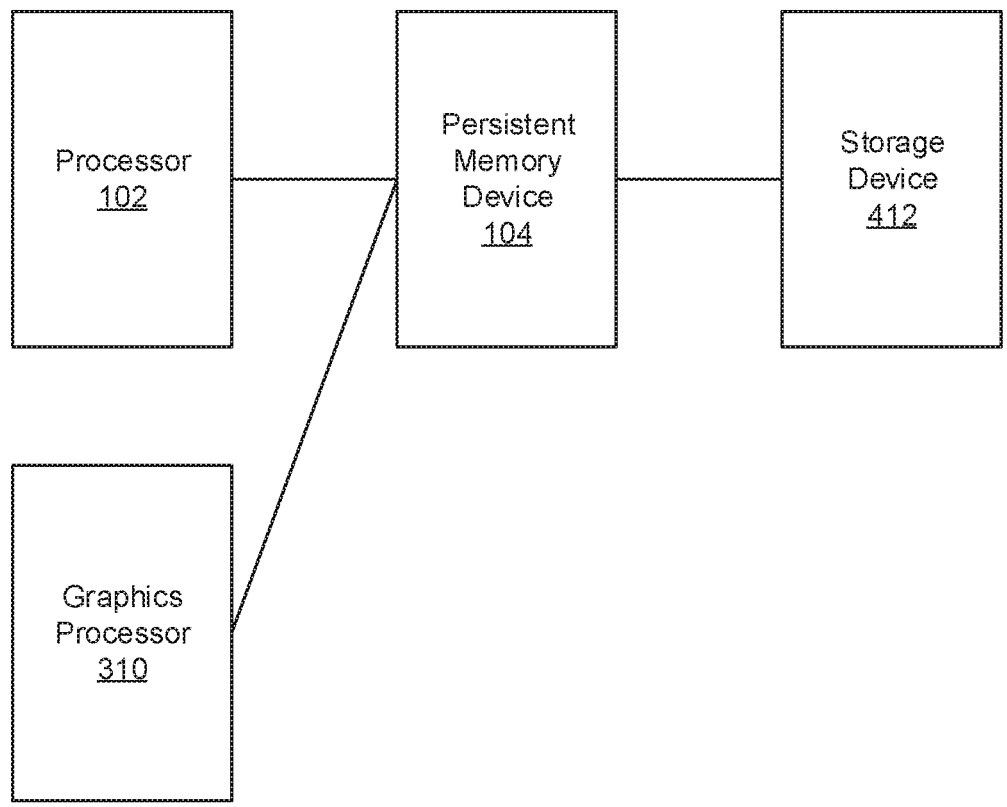
FIG. 4 is a diagram of an environment for processing of assets from persistent memory, according to an example of the principles described herein.

In some examples as depicted in FIG. 4, the graphics processor (310) shares access to the persistent memory device (104). However, in other examples, the graphics processor (310) does not share access to the persistent memory device (104). In this example, application assets (108) may be copied when operated on by the graphics processor (310) such as a GPU, but are not moved when operated on by the processor (102) such as a CPU.

FIG. 4 is a diagram of an environment for processing of application assets (FIG. 1, 108) from persistent memory, according to an example of the principles described herein. During an initial setup phase, for example, during game installation on the computing system (FIG. 1, 100), the application and application assets (FIG. 1, 108) may be loaded from a storage device (412) such as a spinning disk or other storage media, to the persistent memory device (104). In so doing asset identifiers are assigned to particular application assets (FIG. 1, 108). Those asset identifiers, along with the location of the corresponding application assets (FIG. 1, 108) on the persistent memory device (104), are created as entries in the asset map (FIG. 1, 106). Then, during application loading and saving, those application assets (FIG. 1, 108) are called by the processor (102) that is executing the application.

As described above, the computing system (FIG. 1, 100) also includes a graphics processor (310) which increase the quality of video and graphics. When used, the graphics processor (310) lessens the work of the processor (102) and produces faster video and graphics. In some examples, as depicted in FIG. 4, the graphics processor (310) shares access to the persistent memory device (104). Thus, not only does the processor (102) performance increase by not having to load from non-volatile storage via an intermediate volatile storage, the graphics processor (310) performance also increases by similarly not having to load from non-volatile storage via an intermediate volatile storage.

Figure 5:
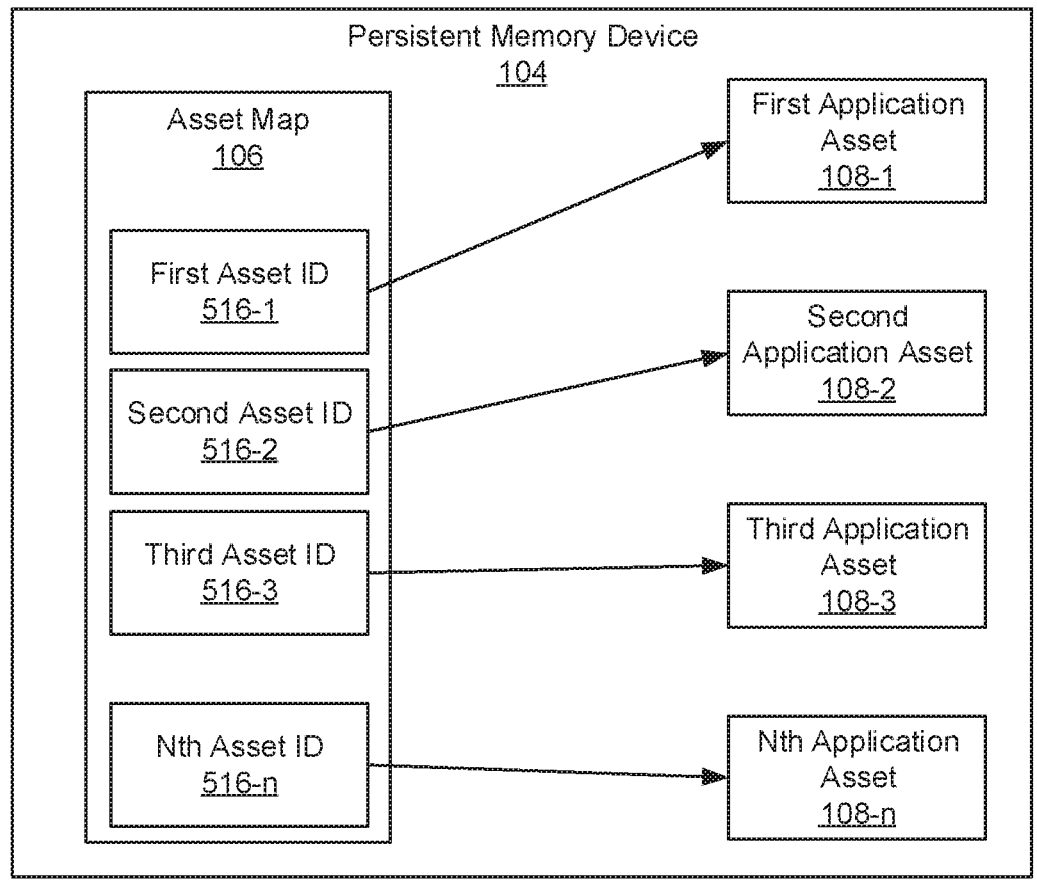
FIG. 5 is a diagram of an asset map for asset processing from persistent memory; according to an example of the principles described herein.

FIG. 5 is a diagram of an asset map (106) for application asset (108) processing from persistent memory, according to an example of the principles described herein. As described above, the persistent memory device (104) includes both an asset map (106) and a number of application assets (108). The asset map (106) includes a number of asset identifiers (516) which point to locations in the persistent memory device (104) where corresponding application assets (108) are stored. For example, a first asset identifier (516-1) includes a pointer to a first asset (108-1) as stored in the persistent memory device (104). Similarly, a second asset identifier (516-2), third asset identifier (516-3), and nth asset identifier (516-n) include pointers to a second asset (108-2), third asset (108-3), and nth asset (108-n) as stored in the persistent memory device (104).

Still further as described above, the asset identifiers (516) may refer to identifiers already used by the application, which identifiers indicate the type of application asset (FIG. 1, 108) referenced. When an application is initially setup, for example during video game installation, the application assets (108) may be stored to a persistent memory device (104). Then an asset identifier (516) is generated for that application asset (108), which asset identifier (516) may be unique to the computing system (FIG. 1, 100) or may be an identifier (516) already used by the application. The memory address of the application asset (108) and the asset identifier (516) are then stored together as an entry within the asset map (106). Storing both the asset map (106) and the application assets (108) themselves in the persistent memory device (104) increases user experience by allowing faster loading and saving, thus reducing breaks in user immersion.

FIG. 6 is a flowchart of a method (600) for application asset (FIG. 1, 108) processing from persistent memory, according to an example of the principles described herein. The method (600) may be grouped into a number of phases; specifically, a setup phase, a loading phase, and a saving phase.

During a setup phase, application assets (FIG. 1, 108) are copied from a storage device (FIG. 4, 412) such as a hard disk drive, a solid state drive, spinning media, flash drives, or network-connected storage among others and placed in a data structure in a persistent memory device (FIG. 1, 104) with direct access by the processor (FIG. 1, 102).

According to the method (600), during this setup phase, a number of application assets (FIG. 1, 108) to be called during application execution are identified (block 601). Examples of such application assets (FIG. 1, 108) include images, textures videos, animations, maps, levels, and characters, among others used in a video game. Still during the setup phase, for each application asset (FIG. 1, 108), a unique asset identifier (FIG. 5, 516) is assigned (block 602) to each of the application assets (FIG. 1, 108). As described above, the application identifier (FIG. 5, 516) may be specially created for the persistent memory device (FIG. 1, 104) or may be an existent identifier of a particular application asset (FIG. 1, 108).

The application assets (FIG. 1, 108) are copied (block 603) from the storage device (FIG. 4, 412) to the persistent memory device (FIG. 1, 104) and an entry is then inserted (block 604) into an asset map (FIG. 1, 106), which entry associates the application asset (FIG. 1, 108) location with the unique asset identifier (FIG. 5, 516). As described, the operations described in blocks 601, 602, 603, and 604 may be performed during a setup phase such as initial game installation. However, in some examples, they may be performed at other times. For example, there may be a limited amount of persistent memory available on the persistent memory device (FIG. 1, 104) and a number of application assets (FIG. 1, 108) for a number of different applications may already be stored thereon. Accordingly, at some point, application assets (FIG. 1, 108) may be removed from the persistent memory device (FIG. 1, 104) back to the storage device (FIG. 4, 412) and different application assets (FIG. 1, 108) may be called from the storage device (FIG. 4, 412) to the persistent memory device (FIG. 1, 104). In this example, such removing and loading based on limited persistent memory device (FIG. 1, 104) space may be at a time outside game loading and/or saving.

Following application setup, the application may enter a loading phase wherein application assets (FIG. 1, 108) are loaded. Such a loading phase can occur when a video game is started or when a video game is resumed following a save operation. Such loading is fast as the application assets (FIG. 1, 108) are obtained directly from a persistent memory device (FIG. 1, 104). During this loading phase, an asset map (FIG. 1, 106) is searched (block 605) for an asset identifier (FIG. 5, 516) associated with an application asset (FIG. 1, 108) called by the processor (FIG. 1, 102). This may be performed as described above in regards to FIG. 2.

It is then determined (block 606) if the application asset (FIG. 1, 108) is found in the persistent memory device (FIG. 1, 104). If the application asset (FIG. 1, 108) is not found in the persistent memory device (FIG. 1, 104) (block 606, determination NO), then the application asset (FIG. 1, 108) is identified (block 601) on the storage device (FIG. 4, 412), assigned (block 602) a unique identifier (FIG. 5, 516), copied (block 603) to the persistent memory device (FIG. 1, 104) and an entry inserted (block 604) for the application asset (FIG. 1, 108). The asset map (FIG. 1, 106) can then be searched (block 605) again to find the asset identifier (FIG. 5, 516).

If the application asset (FIG. 1, 108) is found in the persistent memory device (FIG. 1, 104) (block 606, determination YES), the application asset (FIG. 1, 108) is located (block 607) and processed (block 608) from its location in the persistent memory device (FIG. 1, 104). This may be performed as described above in connection with FIG. 2. As described, the operations described in blocks 605, 606, 607, and 608 may be performed during a loading phase such as game loading or resuming.

During execution of the application, or following execution of the application, for example to save a game following game play or during game play, a save phase may be entered such that the application, e.g., video game, can be resumed at a later point in time. During such a save operation, a transaction is initialized (block 609). During a transaction all updates to the application made during a particular time period are made at the same time. For example, all modifications are logged while the transaction is active and are then committed once the transaction is closed. If just some of the application assets (FIG. 1, 108) were updated, an incorrect application environment may be loaded upon resume. In other words, during the save phase, all data elements that compose a current status of the application, i.e., gameplay, are stored and accessed directly in the persistent memory device (FIG. 1, 104). This includes not only art assets (FIG. 1, 108), but game play information including character assets, object assets, and position and collision information among others. Such information is saved in a failure-tolerant way, i.e., transactionally, such that power-losses, crashes, or any other unexpected of game execution will maintain the gameplay information in a consistent, resumable state in the persistent memory device (FIG. 1, 104).

Following initialization (block 609) of the transaction, multiple application assets (FIG. 1, 108) as stored in the persistent memory device (FIG. 1, 104) are updated (block 610). As described above, some of these may be user-specific such as character profiles. Once the application assets (FIG. 1, 108) are updated (block 610), the transaction is committed (block 611), i.e., saved as a block to the persistent memory device (FIG. 1, 104).

In some examples, this save phase may be independent of a prompted explicit save instruction in the application. That is, some applications such as video games prompt a user at different points, to save a game, which can result in a time lag. However, by saving gameplay data by updating application assets (FIG. 1, 108) to a persistent memory device (FIG. 1, 104), such lag can be avoided, and the save phase entered into multiple times per second. In other words, via this save phase, it may be possible to avoid an explicit, save game prompt and instead the last gameplay state can be immediately restored from the point it was interrupted. As described, the operations described in blocks 609, 610, and 611 may be performed during a save phase.

In some examples, application assets (FIG. 1, 108) may be removed (block 612) to the storage device (FIG. 4, 412) based on usage information. That is, outside of application execution, it may be determined that a certain set of applications are most often executed, and the corresponding application assets (FIG. 1, 108) may be loaded to the persistent memory device (FIG. 1, 104). Then, via user input or statistical analysis, those application assets (FIG. 1, 108) may be removed (block 612) in favor of application assets (FIG. 1, 108) pertaining to another application.

Figure 7:
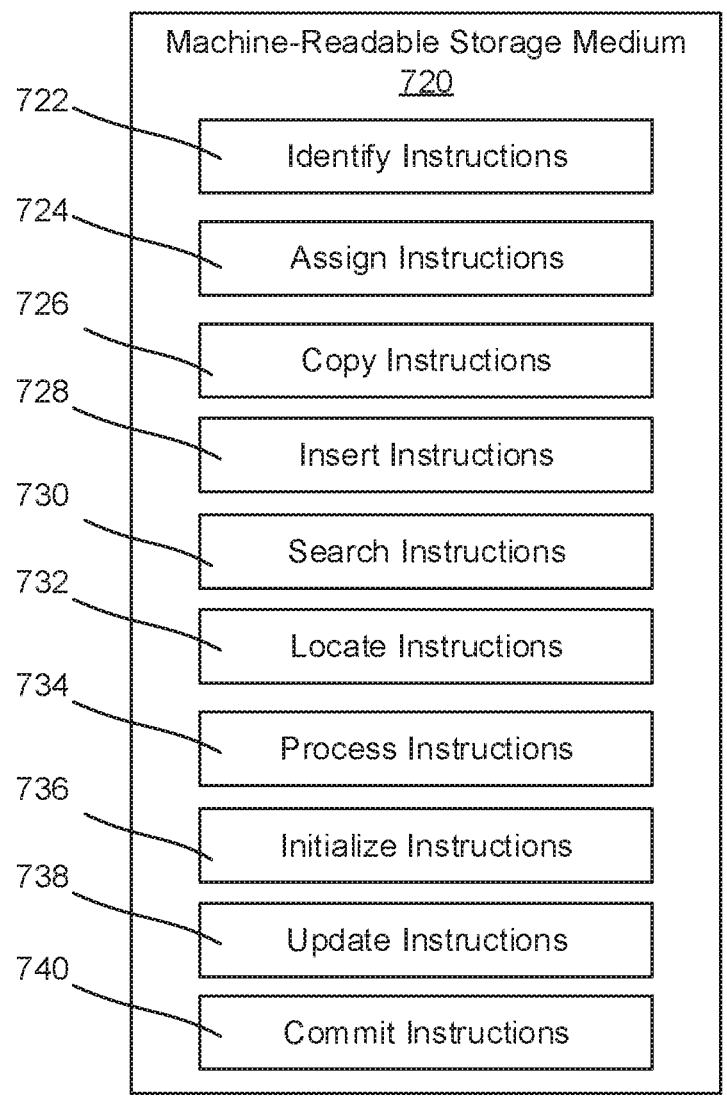
FIG. 7 is a diagram of a non-transitory machine-readable storage medium for asset processing from persistent memory, according to an example of the principles described herein.

FIG. 7 is a diagram of a non-transitory machine-readable storage medium (720) for application asset (FIG. 1, 108) processing from persistent memory, according to an example of the principles described herein. To achieve its desired functionality, a computing system includes various hardware components. Specifically, the computing system includes a processor. Machine-readable storage medium (720) is communicatively coupled to the processor. The machine-readable storage medium (720) includes a number of instruction sets (722, 724, 726, 728, 730, 732, 734, 736, 738, 740) for performing a designated function. The machine-readable storage medium (720) causes the processor to execute the designated function of the instruction sets (722, 724, 726, 728, 730, 732, 734, 736, 738, 740).

Although the following descriptions refer to a single machine-readable storage medium (720), the descriptions may also apply to multiple machine-readable storage mediums. In such examples, the instruction sets (722, 724, 726, 728, 730, 732, 734, 736, 738, 740) may be distributed (e.g., stored) across multiple machine-readable storage mediums.

The processor refers to at least one processor and other resources used to process programmed instructions. For example, the processor may be a number of central processing units (CPUs), microprocessors, and/or other hardware devices suitable for retrieval and execution of instructions stored in machine-readable storage medium (720). The processor may fetch, decode, and execute instructions (722, 724, 726, 728, 730, 732, 734, 736, 738, 740) for application asset (FIG. 1, 108) processing from persistent memory. In one example, the processor may include a number of electronic circuits comprising a number of electronic components for performing the functionality of a number of the instructions in the machine-readable storage medium (720). With respect to the executable instruction, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (720) represent generally any memory capable of storing data such as programmed instructions or data structures used by the computing system. The machine-readable storage medium (720) includes a machine-readable storage medium that contains machine-readable program code to cause tasks to be executed by the processor. The machine-readable storage medium (720) may be tangible and/or non-transitory storage medium. The machine-readable storage medium (720) may be any appropriate storage medium that is not a transmission storage medium. For example, the machine-readable storage medium (720) may be any electronic, magnetic, optical, or other physical storage device that stores executable instructions. Thus, machine-readable storage medium (720) may be, for example, Random Access Memory (RAM), a storage drive, an optical disc, and the like. The machine-readable storage medium (720) may be disposed within the computing system. In this situation, the executable instructions may be "installed" on the computing system. In one example, the machine-readable storage medium (720) may be a portable, external or remote storage medium, for example, that allows the computing system to download the instructions from the portable/external/remote storage medium. In this situation, the executable instructions may be part of an "installation package". As described herein, the machine-readable storage medium (720) may be encoded with executable instructions for application asset (FIG. 1, 108) processing in persistent memory.

Referring to FIG. 7, identify instructions (722), when executed by a processor, may cause the computing system to identify a number of application assets (FIG. 1, 108) to be called during execution of a video game. Assign instructions (724), when executed by a processor, may cause the computing system to assign a unique asset identifier (FIG. 5, 516) to each of the number of application assets (FIG. 1, 108). Copy instructions (726), when executed by a processor, may cause the computing system to copy each of the number of application assets (FIG. 1, 108) from a storage device (FIG. 4, 412) to a persistent memory device (FIG. 1, 104). Insert instructions (728), when executed by a processor, may cause the computing system to insert an entry into an asset map (FIG. 1, 106) stored in the persistent memory device (FIG. 1, 104) which asset map (FIG. 1, 106) associates each application asset (FIG. 1, 108) with its unique asset identifier (FIG. 5, 516).

The machine-readable storage medium (720) also includes instructions executed during execution of a computer game. Specifically, search instructions (730), when executed by a processor, may cause the computing system to search the asset map (FIG. 1, 106) for an asset identifier (FIG. 5, 516) associated with the application asset (FIG. 1, 108). Locate instructions (732), when executed by a processor, may cause the computing system to locate, using the asset identifier (FIG. 5, 516), the application asset (FIG. 1, 108) in the persistent memory device (FIG. 1, 104). Process instructions (734), when executed by a processor, may cause the computing system to process the application asset (FIG. 1, 108), by the processor (FIG. 1, 102), from its location in the persistent memory device (FIG. 1, 104).

The machine-readable storage medium (720) also includes instructions executed during saving of a computer game. Specifically, initialize instructions (736), when executed by a processor, may cause the computing system to initialize a transaction in the persistent memory device (FIG. 1, 104). Update instructions (738), when executed by a processor, may cause the computing system to update multiple application assets (FIG. 1, 108) as stored in the persistent memory device (FIG. 1, 104). Commit instructions (740), when executed by a processor, may cause the computing system to commit the transaction.

In some examples, the processor and machine-readable storage medium (720) are located within the same physical component, such as a server, or a network component. The machine-readable storage medium (720) may be part of the physical component's main memory, caches, registers, non-volatile memory, or elsewhere in the physical component's memory hierarchy. In one example, the machine-readable storage medium (720) may be in communication with the processor over a network. Thus, the computing system may be implemented on a user device, on a server, on a collection of servers, or combinations thereof.

In summary, using such an asset processing system 1) enhances technical performance by decreasing game loading and saving times; 2) enhances user experience; 3) reduces "breaks" in user immersion; and 4) facilitates higher power, and increased amounts of data transfer. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
    during execution of an application, as application assets are called, searching an asset map stored in a persistent memory device for asset identifiers pointing to respective non-volatile locations of the application assets in the persistent memory device;
    using the asset identifiers, locating the application assets in the persistent memory device, wherein the application assets are directly accessed from the persistent memory device by a processor executing the application, wherein the direct access of the application assets from the persistent memory device does not move the application assets from the respective non-volatile locations of the application assets and does not move or copy the application assets to another memory location; and
    processing the application assets, by the processor, from the respective non-volatile locations in the persistent memory device.

2. The method of claim 1, further comprising, during a setup phase of the application:
    identifying the application assets to be called during execution of the application;
    assigning the asset identifiers to the application assets;
    copying each of the application assets from a storage device to the persistent memory device; and
    inserting an entry into the asset map associating each respective application asset with an asset identifier of the respective application asset.

3. The method of claim 1, further comprising, during a save phase:
    initializing a transaction in the persistent memory device;
    updating multiple application assets as stored in the persistent memory device, wherein an application asset of the multiple application assets comprises user-specific information; and
    committing the transaction.

4. The method of claim 1, wherein the application is a video game application, and the application assets are video game assets.

5. The method of claim 4, wherein the video game assets comprise animation information and character data for characters in a video game.

6. The method of claim 1, further comprising processing, by a graphics processor, an application asset of the application assets from the non-volatile location of the application asset in the persistent memory device.

7. The method of claim 1, further comprising removing a number of application assets related to a particular application from the persistent memory device to a storage device based on usage information.

8. The method of claim 1, wherein an asset identifier of the asset identifiers contains information of a type of a respective application asset of the application assets, and wherein the application assets comprise different types of application assets.

9. The method of claim 8, wherein the asset identifier further contains information of the non-volatile location of the respective application asset.

10. A system comprising:
    a persistent memory device to store application assets of an application and an asset map that maps application asset locations on the persistent memory device and asset identifiers for the application assets; and
    a processor to:
        execute the application,
        during the execution of the application, search the asset map for the asset identifiers of the application assets, and
        directly access the application assets from the persistent memory device, wherein the direct access of the application assets from the persistent memory device does not move the application assets from the application asset locations of the application assets and does not move or copy the application assets to another memory location.

11. The system of claim 10, wherein:
    the application is a video game application; and
    the application assets are video game assets used during execution of a video game.

12. The system of claim 10, further comprising a graphics processor to process a portion of the application assets.

13. The system of claim 12, wherein the graphics processor shares access to the persistent memory device with the processor.

14. The system of claim 12, wherein the portion of the application assets processed by the graphics processor are stored in a memory device independent of the persistent memory device.

15. The system of claim 10, wherein an asset identifier of the asset identifiers contains information of a type of a respective application asset of the application assets, and wherein the application assets comprise different types of application assets, and wherein the asset identifier further contains information of the application asset location of the respective application asset in the persistent memory device.

16. A non-transitory machine-readable storage medium comprising instructions that upon execution cause a system to:
    during a setup phase for a video game:
        identify video game assets to be called during execution of the video game;
        assign a unique asset identifier to each of the video game assets;
        copy each of the video game assets from a storage device to a persistent memory device; and insert an entry into an asset map stored in the persistent memory device, the asset map associating each respective video game asset of the video game assets with the unique asset identifier of the respective video game asset; and during a loading phase for the video game:
search the asset map for the unique asset identifiers associated with the video game assets;
using the unique asset identifiers, locate the video game assets in the persistent memory device, wherein the video game assets are directly accessed from the persistent memory device by a processor executing the video game, wherein the direct access of the video game assets from the persistent memory device does not move the video game assets from respective non-volatile locations of the video game assets in the persistent memory device and does not move or copy the video game assets to another memory location; and
process the video game assets from the respective non-volatile locations in the persistent memory device.

17. The non-transitory machine-readable storage medium of claim 16, wherein the setup phase for the video game occurs during loading of the video game into the system.

18. The non-transitory machine-readable storage medium of claim 16, wherein the instructions upon execution cause the system to:
during a save phase for the video game:
initialize a transaction in the persistent memory device;
update multiple video game assets as stored in the persistent memory device, which a video game asset of the multiple video game assets comprises user-specific information; and
commit the transaction.

19. The non-transitory machine-readable storage medium of claim 16, wherein the video game assets comprise animation information and character data for characters in the video game.

20. The non-transitory machine-readable storage medium of claim 16, wherein a unique asset identifier of the unique asset identifiers contains information of a type of a respective video game asset of the video game assets, and wherein the video game assets comprise different types of video game assets, and wherein the unique asset identifier further contains information of the non-volatile location of the respective video game asset in the persistent memory device.

* * * * *